United States Patent [19]

Nakase et al.

[11] Patent Number: 4,743,744
[45] Date of Patent: May 10, 1988

[54] BAR CODE READER

[75] Inventors: Koji Nakase; Junichi Ouchi, both of Furukawa, Japan

[73] Assignee: Alps Electric Co., Ltd., Tokyo, Japan

[21] Appl. No.: 881,200

[22] Filed: Jul. 2, 1986

[30] Foreign Application Priority Data

Jul. 9, 1985 [JP] Japan .................... 60-151914

[51] Int. Cl.4 .............................................. G06K 7/10
[52] U.S. Cl. ...................................... 235/472; 235/462
[58] Field of Search ................................. 235/462, 472

[56] References Cited

U.S. PATENT DOCUMENTS 4,465,926 8/1984 Apitz et al. ..................... 235/472

Primary Examiner—Harold I. Pitts
Attorney, Agent, or Firm—Guy W. Shoup; Leighton K. Chong

[57] ABSTRACT

A bar code reader for reading and decoding bar code information as on an article of merchandise comprising in series a counting circuit outputting the counter value corresponding to the signal detected by an optical head, a code converter for converting said counter value into the multilevel image signal, a memory circuit for storing said multilevel signal input from said code converter and an automatic discriminating and decoding circuit for reading said multilevel signal stored in said memory circuit, discriminating and decoding.

1 Claim, 3 Drawing Sheets

BAR CODE READER

BACKGROUND OF THE INVENTION

1. Field of the Invention

This invention relates to a bar code reader for optically detecting bar code information appearing on the surface of various objects, and automatically discriminating and more particularly to improvement in circuit configuration.

2. Description of the Prior Art

Bar codes are generally used for the identification of articles of merchandise in shops and warehouses.

Such bar code representation varies with the kind of the article, and therefore it is necessary for reading the bar code to discriminate or identify representation, for example, multilevel such as binary or ternary, "JAN" or "3 of 9", etc.

Under the circumstances, there have been devised automatic bar code readers capable of automatically discriminating and decoding such bar codes. It takes a relatively longer time for them to perform decoding itself, or, to detect an error signal after having failed in decoding.

Under the circumstances, there has been demand for a miniaturized bar code reader capable of automatically decoding at a high-speed for application to various types of bar code information.

DESCRIPTION OF THE PRIOR ART

An example of a prior art bar code reader performing the automatic discriminating and decoding function will be described with reference to FIG. 2 which is a block circuit diagram, and FIGS. 3A and B which show the stages of processing for reading the corresponding binary and quaternary signals to the original bar code pattern, respectively.

Figure 2:
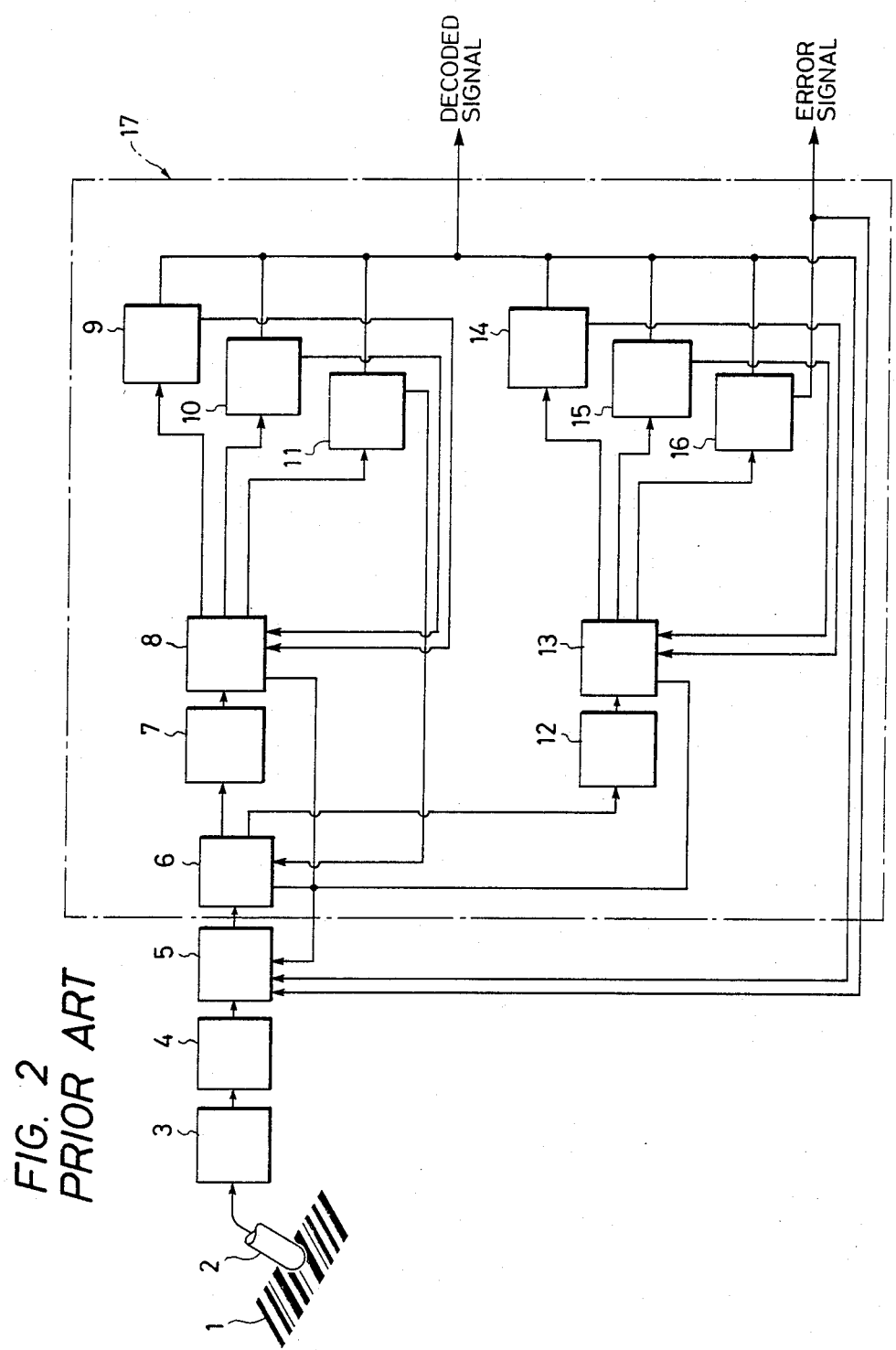
FIG. 2 is a schematic block diagram of a prior art bar code reader.

In FIG. 2, reference numerals designate 1, a bar code; 2, an optical head; 3, shaper; 4, a counting circuit; 5, a RAM circuit; 6, 8 and 13, switching circuits; 7, a first code converter; 9 through 11, multilevel decoders; 12, a second code converter; 14 through 16, binary decoders; and 17, an automatic discriminating and decoding circuit.

Figure 3A:
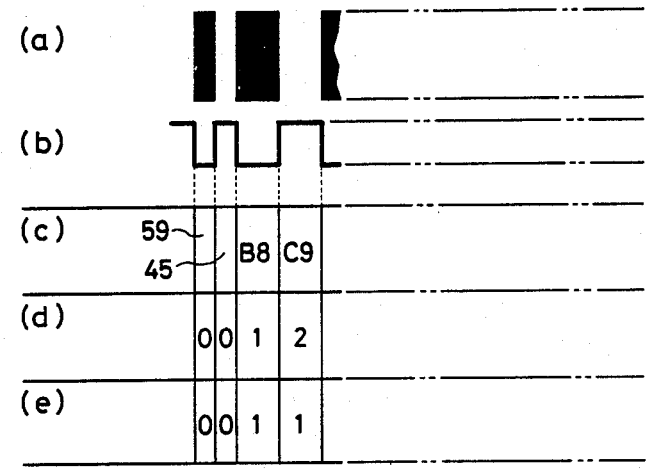
FIGS. 3A and B are the representation of signal outputs from individual component circuits.
Figure 3B:
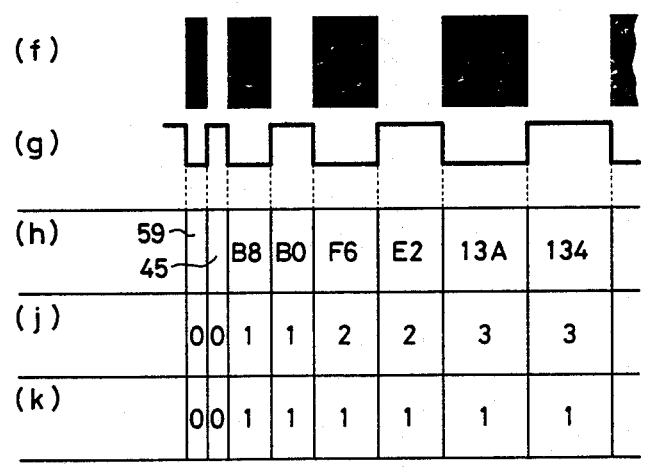

In the conventional example shown, a bar code 1 appearing as on a product label is scanned with the optical head 2, which outputs the corresponding electrical signal to the shaper 3, and there the bar code pattern a (FIG. 3A) or f(FIG. 3B) is shaped into rectangular waveform b (FIG. 3A) or g(FIG. 3B). The thus-generated pulses are transmitted to the counting circuit 4, in which their widths are in sequence counted and output, for example, as 16-bit digitized counter values c or h correspondent to the rectangular signal b or g. The counter value is transmitted in sequence from the counting circuit 4 to the RAM circuit 5 and stored there in the form correspondent to a set of bar codes. To the RAM circuit 5, also "transmission" command signals and reset signals are supplied from the later-described automatic discriminating and decoding circuit 17. Upon having stored data correspondent to a set of bar codes, the RAM circuit 5 outputs the stored data to the automatic discriminating and decoding circuit 17. The first signal switching circuit 6 of the automatic discriminating and decoding circuit 17 couples in one output position thereof the signal output from the RAM circuit 5 to multilevel decoders and in the other output position thereof to binary decoders. This circuit 6 is designed initially to be positioned to couple the counter value signal from the RAM circuit 5 to the first code converter 7, which converts the counter value signal input thereto c (FIG. 3A) or h (FIG. 3B) into the 2-bit multilevel image signal d or j, which is input through the second switching circuit 8, firstly to the first multilevel decoder 9. When this decoder 9 succeeds in decoding the multilevel image signal d or j, the decoded signal is output. At the same time the decoded signal is applied to the RAM circuit 5, which thereby is reset. On the other hand, when the multilevel decoder 9 fails in decoding the multilevel image signal d or j, a "switching" command is output from the first multilevel decoder 9 to the second switching circuit 8, which is operated to both connect the first code converter 7 to the second multilevel decoder 10 and output a "transmission" command signal to the RAM circuit 5. Upon receiving the "transmission" command signal, the RAM circuit 5 outputs the counter value c or h through the first switching circuit 6 to the first code converter 7, in which the counter value c or h is converted into a multilevel image signal d or j, and then transmitted to the second multilevel decoder 10. Then the second multilevel decoder 10 outputs either, when having succeeded in decoding, the decoded signal to the RAM circuit 6, which is reset, or when decoding has failed, a "switching" command signal to the second switching circuit 8. In the same way as mentioned above, the second switching circuit 8 is operated, and, when the "transmission" command signal reaches the RAM circuit, the counter value c or h is output from the RAM circuit 5, converted into multilevel image signal d or j in the first code converter 7, and applied to the next multilevel decoder. Likewise, when all the subsequent multilevel decoders one after another have failed in decoding, the last (herein n-th) multilevel decoder 11 transmits a "switching" command to the first switching circuit 6, which is operated to connect the RAM circuit 5 to the second code converter 12 and outputs a "transmission" command signal synchronous with the "switching" command to the RAM circuit 5.

In this state, now assuming that a bar code read by the optical head 2 is some other than multilevel code, such as a binary code having the bar code pattern shown in FIG. 3A, in this state, the RAM circuit 5 outputs the counter value represented by c of FIG. 3A through the first switching circuit 6 to the second code converter 12, where the count value c is converted to the binary image signal represented by e of FIG. 3A (referred to as "e"), and then output to the third signal switching circuit 13. The third switching circuit 13 outputs a binary image signal e to the first binary decoder 14. If decoding has succeeded by it, the decoded signal is output from it to the RAM circuit 5, which is reset. When having failed in decoding, in the same procedure as that for multilevel signal decoding, the third switching circuit 13 responds to the "switching" command signal output from each of the second-through-(n−1) binary decoding circuits 15, to operate to couple the binary image signal e to the next binary decoder 15, and also outputs a "transmission" command signal synchronous with the "switching" command. If also n-th binary decoder 16 has failed in decoding, an error signal is output from it. The error signal, which means that the bar code must be redetected, is transmitted to the RAM circuit 5, which is reset.

Further if an error signal or the decoded signal is output, each of the first, second and third switching circuits 6, 8 and 13 is reset to the initial connection. The above-mentioned conventional bar code reader circuitry, however, is designed so that the counter value c or h from the counting circuit 4 which has a large number of digits, such as 16-bit, is stored on the RAM circuit 5 as a large volume of data, which consequently causes a number of problems: a large memory capacity of the RAM circuit 5 is required inevitably, resulting in turn in a larger space requirement for installation of the RAM circuit 5 and in expensive memory elements.

SUMMARY OF THE INVENTION

It therefore is the principal object of the invention to provide a bar code reader having a modified configuration to permit reduction the requisite memory capacity of the RAM circuit 5 compared with the prior art circuit.

The above-mentioned technical problems have been solved by such a construction according to the invention wherein there is provided a counting circuit 4 which outputs the counter value c or h derived from the signal detected from the bar code information by the optical head 2, a first code converter 7 for converting the counter value c or h into the multilevel image signal d or j, a RAM circuit 18 which is a memory circuit for storing the signal output from the first code converter 7, and an automatic discriminating and decoding circuit 19 for reading repeatedly the stored signal from the RAM circuit 18, discriminating and decoding.

The above-described bar code reader works as follows:

The signal detected by the optical head 2 is shaped into pulses of a desired waveform and fed to the counting circuit 4 to be counted. From it, the counter value c or h having a large number of digits is output to the first code converter 7, there it is converted into the multilevel image signal d or j having a small number of digits, and output to the RAM circuit 18 with a smaller memory capacity to be stored on it. The small-number-digit multilevel image signal d or j is output repeatedly by a desired number of times to the automatic discriminating and decoding circuit 19 to be decoded, and this, even if it is binary bar code information, can be accomplished accurately and at a higher speed. When decoding has failed at last, an error signal is output likewise in a short time.

DESCRIPTION OF THE PREFERRED EMBODIMENT

Figure 1:
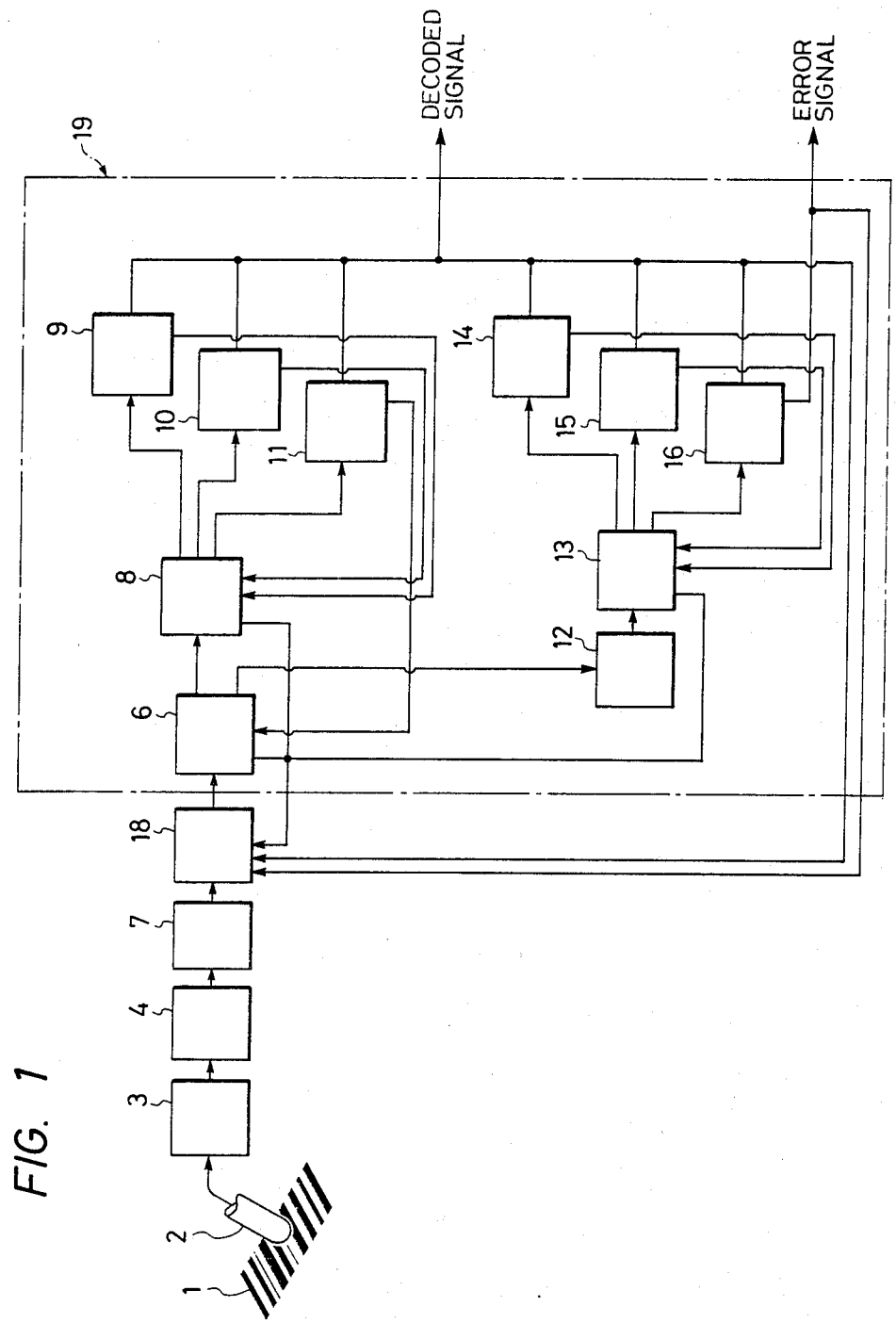
FIG. 1 is a schematic block diagram of a bar code reader embodying the invention.

The invention will be described in detail with reference to the drawings hereinafter:

FIG. 1 is a schematic block diagram of an embodiment of the invention, and in which corresponding components to those in FIG. 2 are designated by the same reference numerals, therefore with omission of the detailed description of them, and reference characters 18 and 19 indicate a RAM circuit and an automatic discriminating and decoding circuit, respectively.

Referring to the construction according to the invention, a set of bar codes 1 is such as of that printed on an article though it is of a large variety in representation and construction. The bar code information 1 is detected by the optical head 2, shaped in the shaper circuit 3, counted in the counting circuit 4, and input to the first code converter 7, where the input digitized counter value as of a large number of digits such as 16-bit is converted into a digitized multilevel image signal of a small number of digits such as 2-bit. The 2-bit multilevel image signal is input to the RAM circut 18 and stored therein. The RAM circuit 18 does not output until a set of data has been stored in there, and thus outputs the set of data to the automatic discriminating and decoding circuit 19. The RAM circuit 18 is designed to operate, in response both to a "transmission" command signal from any of the first-through-n-th multilevel decoder 9 to 11 and the first-through-n-th binary decoding circuits 14 to 16, and to a "reset" signal so that the RAM circuit 18 responds to a "transmission" command signal from the the first, second or third switching circuits 6, 8, and 13 to output the stored data to the automatic discriminating and decoding circuit 19. The RAM circuit 18 also is caused in response to a "decoding done" signal from some of the first-through-n-th multilevel decoder 9 to 11 and the binary decoder 14 to 16, to reset to a state in which it can store the subsequently-input multilevel image signal. The RAM circuit 18 is reset likewise in response to an error signal output from the n-th binary decoder 16. The first switching circuit 6 initially takes the position to couple the multilevel image signal output from the RAM circuit 18 to the second switching circuit 8, and, upon receiving a "switching" command signal from the n-th multilevel decoder 11, operates to couple to the second code converter 12.

In synchronism with the input of this "switching" command, the first switching circuit 6 outputs the "transmission" command signal to the RAM circuit 18. The second switching circuit 8 first takes the position to couple the multilevel image signal from the first signal switching circuit 6 to the first multilevel decoder 9. When the first multilevel decoder 9, has failed in decoding, a "switching" command signal is transmitted from it to the second switching circuit 8, which in response to the signal, couples the multilevel image signal to the second multilevel decoder 10. Upon receiving a "switching" command signal in sequence from the second-through-(n−1)th multilevel decoder 10, the second switching circuit 8 also outputs a "transmission" command signal synchronous with the input of the switching command to the RAM circuit 18. The multilevel image signal is applied through the first and second switching circuit 6, 8 sequentially to the first-through-n-th multilevel decoders 9 to 11. Upon selectively receiving the multilevel image signal, any multilevel decoder engages to decode it in accordance with its own multilevel system.

When the decoding has succeeded in some of the multilevel decoders, the decoded signal is output which is correspondent to the content of the printed bar code information 1. On the other hand, each of the first-through-(n−1) multilevel decoding circuits 9, 10 in sequence, when having failed in decoding, outputs a "switching" command to the second switching circuit 8. When the n-th multilevel decoder 11 has failed in decoding, a "switching" command is transmitted from it to the first switching circuit 6.

The second code converter 12 converts the multilevel image signal input from the first switching circuit 6 into the binary image signal, which is output to the third switching circuit 13. This circuit 13 initially couples the binary image signal to the first binary decoder 14. When it has failed in decoding, a "switching" command is output to the third switching circuit 13, which then connects the second code converter 12 to the second binary decoder 15. The third switching circuit 13 outputs, upon receiving a "switching" command sequentially from the second-through-(n−1)th decoder 15, a "transmission" command signal synchronized with the "switching" command input thereto to the RAM circuit 18. From the RAM circuit 18, the binary image signal is repeatedly output and transmitted through the third switching circuit in sequence to the second-through-n-th binary decoders 15, 16. Each of the first-to-n-th binary decoders 14 to 16 one after another engages to decode the binary image signal selectively input to there in accordance with its own binary system. When any binary decoder has succeeded in decoding, the decoded signal corresponding to the content of the printed bar-code information 1 is output. On the other hand, when the first-through-(n−1) binary decoders 14, 15 one after another have failed to decode, a "switching" command is output from it to the third switching circuit 13. Then when also the n-th binary decoder circuit 11 has failed in decoding, an error signal is output from this circuit to the RAM circuit, which is reset in response to the signal.

Besides the RAM circuit 18 is also reset in response to the decoded signal output from any of the first-through-n-th multilevel decoders circuits 9 to 11 and the binary decoders 14 to 16 thus to allow the next multilevel image signal input thereto to be stored. The first, second and third switching circuits 6, 8, 13 are reset to their initial positions in response to the decoded signal or the error signal through the reset signal line (not shown).

The mode of operation will be described below:

The 16-bit counter value of 16 bit represented by c (FIG. 3A) or h (FIG. 3B) is converted in the first code converter 7 into the signal of a small number digits, such as 2-bit, for example, multilevel image signal represented by d (FIG. 3A) or j (FIG. 3B) whereby the volume of data is reduced to one-eighth. The RAM circuit 18 receiving the multilevel image signal d or j and storing it therefore may have a correspondingly-reduced requisite memory capacity compared with when the counter value c or h is stored in it. The data stored in the RAM circuit 18 is output repeatedly a desired number of times in sequence to the multilevel decoders of the automatic discriminating and decoding circuit 19 and then to the binary decoders through the second code converter 12 until the decoding has been achieved. It takes a shorter time than time for outputting the counter value c or h. The data input in the form of d or j is converted in the second code converter 12 into a binary image signal represented by e (FIG. 3A) or k (FIG. 3B), and then decoded in some of the binary decoders. Thus the input data in the form of multilevel image signal d or j is exactly decoded in binary code. When none of the binary decoders has succeeded in decoding, an error signal is output. The time taken for this process is shorter than such process so that counter value c or h is input sequentially to the binary decoders.

In a preferred embodiment of the invention, when there are many binary bar codes to be processed, a construction is provided which permits switch resetting action of the first switching circuit 6, whereby the process can be accomplished in shorter time.

Further such construction as above-mentioned permitting changing in processing order can be also applied to the second and third switching circuits 8, 12 to change bar code systems to be detected into the order of decreasing incidence, shortening the time taken for processing.

As above-described, the bar code reader according to the invention is of such a construction that the counter value output from the counting circuit 4 is converted into a multilevel image signal having a reduced volume of data and then stored, permitting reduction in requisite memory capacity of the RAM circuit 18, and shortening the time taken for decoding, while the prior art requires a large memory capacity and is associated with a limited number of bar code systems to be decoded. Such reduction in requisite memory capacity of the RAM circuit 18 and in decoding time brings effect of enabling to provide more decoders capable of coping with more bar code systems.

What is claimed is:

1. A bar code reader comprising in series a counting circuit outputting a counter value corresponding to a signal detected by an optical head, a code converter for converting said counter value into a multilevel image signal, a memory circuit for storing said multilevel signal input from said code converter and an automatic discriminating and decoding circuit for reading said multilevel signal stored in said memory circuit, discriminating and decoding.

* * * * *